United States Patent Office 3,165,514
Patented Jan. 12, 1965

3,165,514
UNSATURATED TRIAZINE COMPOUNDS
Gaetano F. D'Alelio, South Bend, Ind., assignor, by direct and mesne assignments, to Dal Mon Research Co., Cleveland, Ohio, a corporation of Delaware
No Drawing. Filed Aug. 7, 1962, Ser. No. 215,280
20 Claims. (Cl. 260—248)

This invention relates to new compounds of the formula

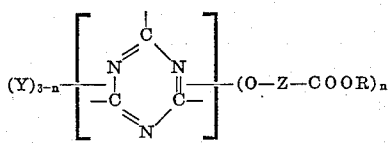

where $n$ is an integer having a value of at least one and no more than three; Z is a divalent radical predominantly hydrocarbon, preferably having no more than 20 carbon atoms, R is an unsaturated hydrocarbon radical as defined more fully hereinafter; and Y represents a monovalent radical, preferably one selected from the class consisting of hydrogen, hydrocarbon, halogen, R'O—, R'S—, $R_2'N$—, wherein R' is hydrogen or a hydrocarbon radical preferably of no more than 12 carbon atoms.

Compounds of the above structure are referred to hereinafter as triazinyl vinyl compounds, or as triazine monomers. For purposes of simplicity, the trivalent 1,3,5-triazine, or symmetrical triazine nucleaus is hereinafter represented as $C_3N_3$.

This application is a continuation-in-part of applicant's copending application Ser. No. 764,249, filed September 30, 1958 issued as Patent No. 3,050,496, August 21, 1962.

In the triazinyl vinyl monomers of this invention Z is a divalent hydrocarbon radical and includes, for example, divalent aliphatic radicals, aromatic radicals, cycloaliphatic radicals, etc., various combinations of such radicals, such as alkaryl, aralkyl, etc., diaryl oxides, diaryl sulfides, diaryl amines, etc., all of which radicals can also have substituents thereon such as chloro, floro, alkoxy, acyloxy, etc. groups. Illustrative examples of divalent radicals that Z can represent in the above formula are:

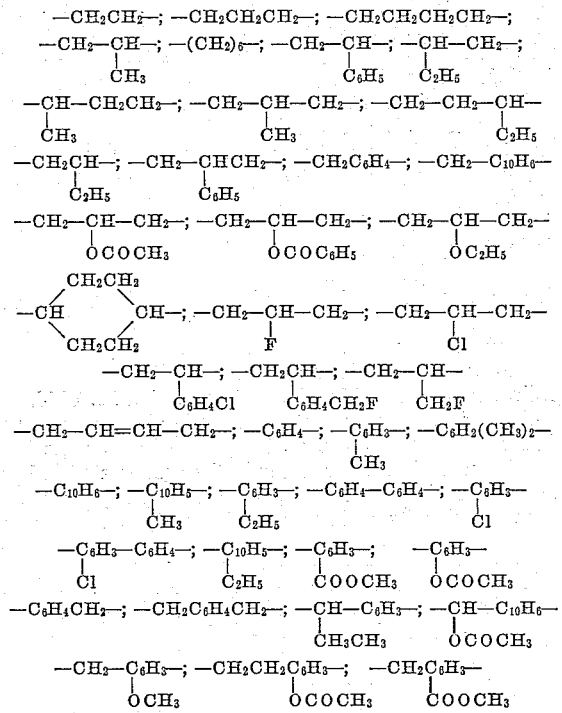

—$C_6H_4NHC_6H_4$—; —$C_6H_4OC_6H_4$—; —$C_6H_4SC_6H_4$—
—$C_6H_3NHC_6H_3$—; —$C_6H_3O$—$C_6H_3$—; —$C_6H_3$—; —C
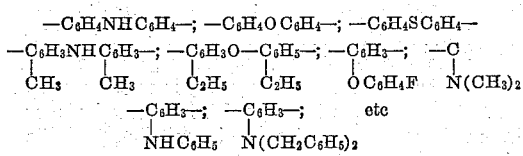
—$C_6H_3$—; —$C_6H_3$—; etc
   |            |
 $NHC_6H_5$  $N(CH_2C_6H_5)_2$ The substituent groups such as the alkoxy, aryloxy, acyloxy, alkylamino, arylamino, etc., radicals are advantageously radicals of no more than than about ten carbon atoms, such as methoxy, ethoxy, butoxy, pentoxy, octoxy, phenylmethoxy, phenylethoxy, acetoxy, propionoxy, butyroxy, valeroxy, capryloxy, benzoxy, phenylacetoxy, toluoxy, etc. Other groups, such as nitroso, nitro, etc., can also be used as substitutents on the Z group provided they are inert during the preparation and use of the triazinyl vinyl monomer. The aliphatic group, or that portion of the Z group which is aliphatic, can be saturated or unsaturated, e.g. —$CH_2$—CH=CH—

—$CH_2$—CH=CH—$CH_2$—
—C≡C—$CH_2$CH=CH—CH=CH—$CH_2$— etc. Also, without departing from the spirit of this invention, the carbon atoms in the divalent radical, Z, can be interrupted by an atom other than carbon, e.g.

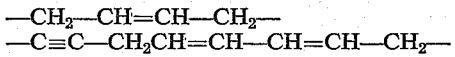

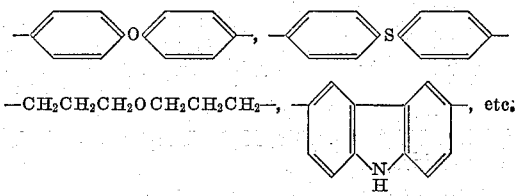

While other hydrocarbon and substituted hydrocarbon groups are also effective as Z groups, Z preferably has no more than 18 carbon atoms and is selected from the class of alkylene, cycloalkylene, alkenylene, naphthylene, diphenylene, diphenyleneoxide, diphenylenesulfide, diphenyleneamine, and derivatives thereof in which the derivative groups are selected from the class of chloro, fluoro, alkoxy, cycloalkoxy, alkenyloxy and acyloxy groups.

The triazinyl vinyl compounds of this invention can be written as $(M)_n(C_3N_3)(Y)_{3-n}$ in which M represents the radical containing the polymerizable group, and the other symbols are as defined above. Where the monomer contains only one polymerizable group, soluble, fusible polymers can be obtained. When the monomer contains two polymerizable groups, that is $(M)_n$ is $(M)_2$ and the remaining or third group is the same or different from the M group, insoluble, infusible polymers can be produced therefrom. When $(M)_n$ is $(M)_2$, insoluble, infusible polymers and copolymers can still be obtained where the Y group is any other polymerizable or non-polymerizable monovalent radical. For example, Y can be hydrogen and alkyl, aryl, aralkyl, alkaryl, cycloaliphatic and heterocyclic groups and their chloro, fluoro, alkoxy, aryloxy, acyloxy derivatives, such as methyl, ethyl, propyl, isopropyl, butyl, octyl, decyl, chloroethyl, fluoropropyl, cyclohexyl, cyclopentyl, phenyl, chlorophenyl, fluorophenyl, xenyl, naphthyl, tolyl, isopropyl phenyl, benzyl, phenethyl, phenyl propyl, acetoxy benzyl, ethoxy propyl, methyl naphthyl, vinyl, allyl, methallyl, allyl pheny, etc., radicals; Y can aso be hydroxyl and the alkoxy and aryloxy radicals derived from aliphatic, cycloaliphatic, aromatic and heterocyclic hydroxy compounds such as methyl alcohol, ethyl alcohol, isopropyl alcohol, butyl alcohol, isobutyl alcohol, decyl alcohol, phenol, the o-, m-, and p-cresols, the xylenols, naphthols, ethylene glycol, methyl glycol ether, butyl glycol ether, glycerina, penta erythritol, hydroxy napthalene, hydroxy pyridine, as well as the alkoxy and aryloxy radicals of hydroxy acids and esters such as lactic acids, ethyl lactate, salicylic acid, methyl salicylate; and in addition Y can be an amino group, NH₂ or the radical of a mono- or di-substituted amino group, for example, the radicals derived from ethyl amine, methyl amine, butyl amine, nonyl amine, dimethyl amine, aniline, naphthyl amine, ethanol amine, diethanolamine, diisopropanol amine, methyl aniline, piperidine, amino pyridine, hydrazine, symmetrical dimethyl hydrazine, unsymmetrical dimethyl hydrazine, as well as the radicals of the amino-acids, amino-amides, amino-nitriles, specific examples of which are:

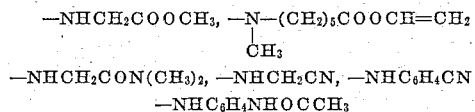

the radicals of semicarbazide and substituted semicarbazides, such as semicarbazide itself, 4-methyl semicarbazide, etc.; as disclosed in my U.S. Patent No. 2,295,565, issued September 15, 1942; the guanazo radical which is attached to the triazine ring by reacting dicyandiamide with a hydrazino triazine as shown in my U.S. Patent No. 2,295,567, issued September 15, 1942; the radicals of urea and substituted ureas, such as —NHCONH₂, CH₃NHCONH—, etc., which may be attached to the triazine ring as shown in my U.S. Patent No. 2,312,688, issued March 2, 1943; radicals of aminoaryl sulphonamides, e.g.

—NHC₆H₄SO₂NH₂

—NHC₆H₄SO₂NHCH₃, etc. as shown in my U.S. Patent No. 2,212,697, issued March 2, 1943; radicals of acyl hydrazine and substituted hydrazines, such as

CH₃CONHNH—

C₂H₅CONHNC₆H₅—, C₆H₅SO₂NHNH₂, etc. radicals of alkylene amines, such as

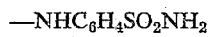

Y can also be the polymerizable radical of the acrylic, methacrylic, chloracrylic ester or amide of amine alcohols or dialcohols and diamines, e.g.

etc., the radicals of polymerizable aminated or hydroxylated alkenylene aryl compounds, for example

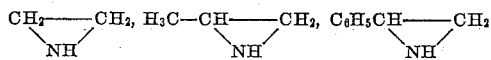

etc., the radicals of malonic and substituted malonic esters, nitriles and amides, e.g.

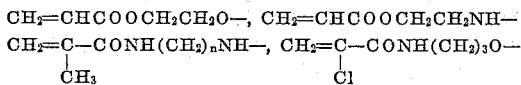

etc., the

radical such as

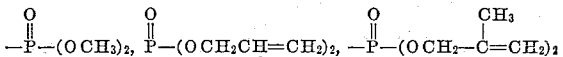

etc., or a triazine ring, e.g., (CH₃NH)₂C₃N₃—, or through a bridge, such as [(CH₃)₂N]₂(C₃N₃NH—CH₂CH₂NH—, (C₂H₅NH)₂(C₃N₃)—OCH₂CH₂O—

(HO)₂(C₃N₃)NHCH₂CH₂O— etc., or the group can represent the remainder of the molecule, for example, (M)ₙ(C₃N₃)— in compounds of the structure (M)₂(C₃N₃)—(C₃N₃)(M)₂, as well as those structures linked together through carbon atoms, sulfur atoms, oxygen atoms, etc., as for example (M)₂(C₃N₃)NHCH₂CH₂NH(C₃N₃)(M)₂
(M)₂(C₃N₃)NHCH₂CH₂O(C₃N₃)(M)₂
(M)₂(C₃N₃)OCH₂CH₂O(C₃H₃)(M)₂ etc.

Thus, it may be seen that a wide variety of modified polymerizable vinyl compounds can be prepared in accordance with the practice of this invention and this modification is achieved by the nature of the Y radical, which can represent any monovalent radical.

When one of the groups attached to the triazinyl ring contains a polymerizable ethylenic group which is not inhibited by the other atoms and groups in the monomer, then a soluble, or fusible, or soluble-fusible polymer is obtained on polymerizing the monomer. Such monomers can also be copolymerized with other monovinyl or monovinylidene monomers, hereinafter generally referred to as vinyl monomers, such as acrylonitrile, methyl methacrylate, etc., to produce modified thermoplastic compositions. It has now been discovered that when two or more polymerizable groups are attached to the triazine ring, insoluble, infusible, heat resistant, and in many cases self-extinguishing polymerization products are obtained. It has been further discovered that the triazinyl-vinyl monomers of this invention can be copolymerized with other monoolefinic and polyolefinic monomers to produce new materials having insolubility, infusibility, and heat resistance and valuable and characteristic properties that make them especially suitable for use in industry, for example, in molding, laminating, casting, coating, and adhesive applications, and for other purposes.

In accordance with this invention, homopolymers of the triazinyl vinyl compounds can be produced as well as compositions of matter comprising an interpolymer (copolymer) or interpolymers of at least one triazinyl vinyl compound of this invention and at least one other polymerizable compound containing the structures or groupings

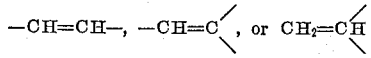

More particularly, it has been discovered that the triazinyl monomers of this invention are especially useful for the preparation of copolymers with unsaturated alkyd resins. As is well known, copolymers of the unsaturated alkyd resins, for example, copolymers of styrene and glycol maleate have wide utility in industry for the preparation of reinforced laminates, radomes, etc. However, such products are limited in their applications by their poor resistance to heat, and are ineffective at relatively high temperatures. Many attempts have been made to improve the heat resistance of such compositions, but with limited success.

It has now been discovered that these problems can be eliminated by the use of certain triazinyl vinyl monomers of this invention which together with the unsaturated alkyd give copolymerizable mixtures which have rapid rates of polymerization, together with high heat resistance, allowing such products to be used at relatively high temperatures. Such products are disclosed in my copending application, Ser. No. 764,249, filed September 30, 1958.

Also, if solvent resistance is desired, this can be achieved by increasing the nitrogen content or the hydroxyl content in the monomer in the groups attached to the triazine ring, or if self-extinguishing properties are desired specifically, or in combination with heat resistance and solvent resistance, this can be accomplished by increasing the nitrogen content, or the halogen content, or the phosphorus content in the groups attached to the triazine ring. Thus, with the new triazinyl vinyl monomers of this invention, a host of new useful compositions can be prepared.

The monomers of this invention can also be added to preformed polymers, such as polacrylonitrile, polyethylene, polystyrene, cellulose acetate, polyvinyl acetate, and then polymerized while admixed with the polymer by added catalyst, or they may be grafted to the polymer by irradiation, such as ionizing radiation from a cobalt or radioactive source, such as ionizing radiation from a linear electron accelerator, etc.

The symbol R represents a terminally unsaturated hydrocarbon radical having a

grouping of the structure $CH_2=CR''-(CR''_2)_m$, wherein $m$ is zero or 1, and $R''$ is hydrogen, halogen, or a hydrocarbon radical preferably of no more than 10 carbon atoms. Typical examples of R include

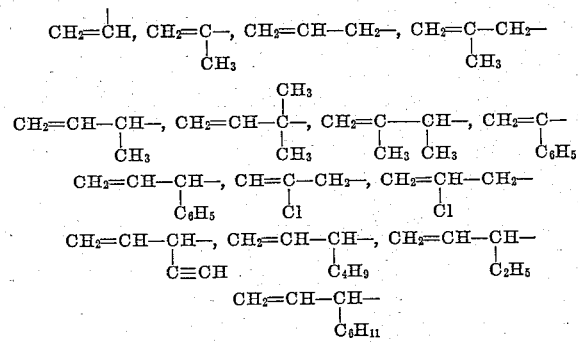

etc. Preferably, because of the ease of polymerizability, $R''$ is hydrogen, as for example, in $CH_2=CH-$ and $CH_2=CHCH_2-$.

In view of the above definition of R, the monomers of this invention can also be represented by the formula $$Y_{3-n}(C_3N_3)[O-Z-COO(CR''_2)_m-CR''=CH_2]_n$$

wherein the symbols are as defined above.

R' represents hydrogen, or a saturated or unsaturated monovalent hydrocarbon radical, such as the aliphatic, cycloaliphatic, aryl, aliphatic-substituted aryl, and aryl-substituted aliphatic, etc. radicals, for example, methyl, ethyl, vinyl, propyl, allyl, isopropyl, butyl, methallyl, secondary butyl, isobutyl, butenyl, amyl, isoamyl, hexyl, octyl, crotyl, cyclopentyl, cyclopentenyl, cyclohexyl, cyclohexenyl, cycloheptyl, phenyl, diphenyl, xenyl, naphthyl, anthracyl, tolyl, xylyl, ethylphenyl, propylphenyl, isopropylphenyl, allyl phenyl, 2-butenyl, phenyl, propenylphenyl, tertiary-butylphenyl, methylnaphthyl, benzyl, cinnamyl, phenylethyl, phenylpropyl, etc., as well as aryl, aliphatic-substituted aryl and aryl-substituted aliphatic radicals, wherein one or more of the hydrogen atoms of the hydrocarbon group has been replaced by, for example, halogen, alkoxy, aryloxy, aralkoxy, alkaryloxy, acetoxy radicals, etc., such as chlorophenyl, dichlorophenyl, bromophenyl, dibromophenyl, methoxy phenyl, methoxy, naphthyl, acetoxy phenyl, benzoxy phenyl, methoxy ethyl, methoxy butyl, acryloxy ethyl, phenoxy phenyl, etc. Preferably, R' is hydrogen, methyl, or phenyl.

Various methods can be employed to produce the triazinyl vinyl monomers of this invention. One method of preparing these new monomers comprises effecting reaction between a halogenated triazine and MH, wherein M is the radical containing the polymerizable group as indicated above, which reaction is represented as follows, in each case using a hydrohalide acceptor such as sodium hydroxide: $(C_3N_3)Cl_3 + 3MH \rightarrow (C_3N_3)(M)_3 + 3HCl$.

When it is desired to modify the monomer by the presence of a Y group, this can be accomplished by first introducing the M group and then introducing the Y groups, for example:

$$(C_3N_3)Cl_3 + 2MH \rightarrow (M)_2(C_3N_3)Cl + 2HCl$$

$$(M)_2(C_3N_3)Cl + YH \rightarrow (M)_2(C_3N_3)Y + HCl$$

or if the Y group is already attached to the triazine ring, then the M group can be attached as for example: $(Y)(C_3N_3)Cl_2 + 2MH \rightarrow (M)_2(C_3N_3)(Y)$; or the Y group can be introduced first, before introducing the M group, as for example $(C_3N_3)Cl_3 + YH \rightarrow Y(C_3N_3)Cl_2 + HCl$ and $Y(C_3N_3)Cl_2 + 2MH \rightarrow Y(C_3N_3)(M)_2 + 2HCl$.

The reaction can be generalized further by the equation $(Y)_{3-n}(C_3N_3)(Cl)_n + nMH \rightarrow (Y)_{3-n}(C_3N_3)(M)_n$ and in the above equations halogen derivatives other than the chloride can also be used, and $n$, M and Y have the same meaning given hereinabove. These reactions can be carried out in an anhydrous liquid medium such as ether, benzene, dioxane, acetone, etc., or in water or in mixtures of water with water-soluble solvents such as acetone-dioxane preferably in the presence of an hydrohalide acceptor such as sodium hydroxide, potassium hydroxide, sodium bicarbonate, sodium carbonate, pyridine, tributyl amine, etc., and at temperatures from below or about room temperature to temperatures corresponding to the refluxing temperature of the solvent or mixture of reactants.

Illustrative examples of halogenated triazine intermediates that can be used in the preparation of triazine monomers include the following:

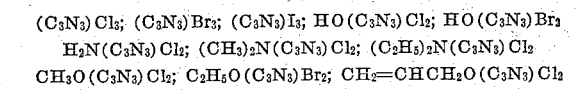

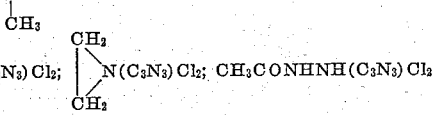

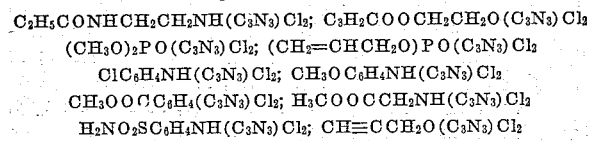

These intermediates can be prepared by various methods reported in the literature for replacing the halogen atoms in halo triazines, such as cyanuric chloride, with various groups such as hydrocarbon groups, alkoxy, aryloxy, substituted amino groups, mercapto, alkylthio, hydroxy, hydrogen, etc. By using the appropriate reagents with such halo-triazines, the various intermediates desired for preparing the compounds of this invention can be prepared following procedures taught in the following references.

For introducing NR'$_2$ groups:

Thurston et al.: Journ. of American Chemical Soc., 73, 2981 (1951);

Thurston et al.: Journ. of American Chemical Soc., 73, 2992 (1951);

Cuthbertson et al.: J. Chem. Soc., 1948, 561;

Diels et al.: Ber. 36, 3191 (1903);

Friedheim: J.A.C.S., 66, 1775 (1944);

Pearlman et al.: J.A.C.S., 70, 3726 (1948).

For introducing alkoxy groups:

Dudley et al.: J.A.C.S., 73, 2986 (1951);

Diels et al.: Ber., 36, 3191 (1903);

Hoffman: Ber., 19, 2061 (1886);

D'Alelio: U.S. Patent 2,295,562;

For introducing aryloxy groups:

Schaefer et al.: J.A.C.S., 73, 2990 (1951);

For introducing hydroxy groups:

Klason: J. prakt. Chem., (2) 34, 152 (1886);

Finger: J. prakt. Chem., (2) 75, 103 (1907);

For introducing sulfide and mercapto groups:

Klason: J. prakt. Chem., (2) 34, 152 (1886);

Hoffman: Ber., 18, 2196 (1885);

Ciba British Patent 318,275 (1930);

D'Alelio et al.: U.S. Patents 2,295,561 and 2,295,562;

For introducing hydrocarbon groups:

Hentrich et al.: U.S. Patent 1,911,689;
Ostrogovich: Chem. Ztg., 36, 738 (1912);
Kracker et al.: U.S. Patent 2,273,115;

For introducing hydrogen:

Ber.: 32, 691 (1899);
Hirt et al.: Helv. chim. Acta, 33, 1365 (1950).

Illustrative examples of MH compounds that can be used as intermediates in the preparation of the triazine monomers include:

$HOCH_2COOCH=CH_2$; $HOCH_2COOC=CH_2$
$HOCH_2COOCH_2CH=CH_2$; $HOCH_2COOCH_2C=CH_2$
              $\mid$
              $CH_3$ $HOCH_2COOCH-C=CH_2$; $HO(CH_2)_4COOCH_2CH=CH_2$
       $\mid$
       $CH_3$ $HO(CH_2)_5COOCH_2CH=CH_2$; $HOC_6H_4COOCH=CH_2$
$HOC_6H_4COOCH_2CH=CH_2$; $HOCF_2CF_2COOCH_2CH=CH_2$

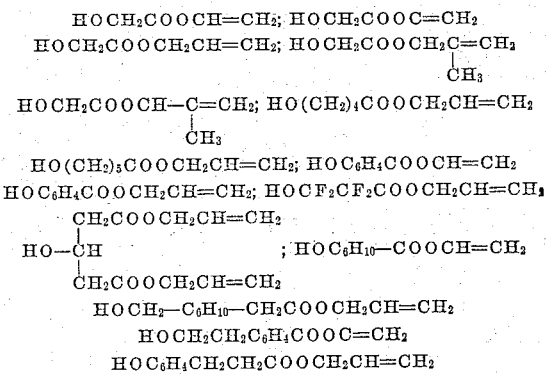

$HOCH_2-C_6H_{10}-CH_2COOCH_2CH=CH_2$
$HOCH_2CH_2C_6H_4COOC=CH_2$
$HOC_6H_4CH_2CH_2COOCH_2CH=CH_2$

The monomers of this invention can also be prepared by reacting the free acid $$(Y)_{3-n}(C_3N_3)(O-Z-COOH)_n$$

with an alcohol, ROH to produce the esters; by reacting the free acid with acetylene or substituted acetylenes to produce vinyl and substituted vinyl compounds according to well known procedures for making vinyl esters; or by ester exchange of a lower ester, such as a methyl or ethyl ester with an unsaturated alcohol, as for example, allyl alcohol, methallyl alcohol, etc.

In these syntheses, the temperature is usually maintained at below 100° C. and preferably in the presence of a polymerization inhibitor.

This invention will be more fully described by the following examples. The invention is not to be regarded, however, as restricted in any way by these examples and they are to serve merely as illustrations. In these examples, as well as throughout the specification, "parts" and "percentages" shall mean parts by weight and percentages by weight unless specifically provided otherwise.

EXAMPLE

*Preparation of Triazine Monomers*

To 53.2 parts of allyl para-hydroxy-benzoate, in a flask equipped with means for refluxing, and 12 parts of sodium hydroxide in 200 parts of water is added slowly and with stirring 18.4 parts of cyanuric chloride in 50 parts of acetone. Upon completion of the addition of the chloride, there is added 1 part of 2,4-diisobutyl paracresol, and the mixture is refluxed for about 4 hours and allowed to cool to room temperature. Thereafter, the mixture is filtered to remove the solid monomer. The monomer is washed with water and is crystallized from acetone-water mixtures. There is obtained the ester $$C_3N_3(OC_6H_4COOCH_2CH=CH_2)_3$$

Ultimate analyses for carbon, hydrogen, nitrogen, and molecular weight determination give values of 62.1%, 4.79%, 7.65%, and 557.6 respectively, all of which are in close agreement with the theoretical values. Substitution of an equivalent amount of $$(C_4H_9)_2N-C_3N_3(Cl_2)$$

for the cyanuric chloride in the above procedure yields the corresponding triazine monomer of the formula $$(C_4H_9)_2N-C_3N_3(OC_6H_4COOCH_2CH=CH_2)_2$$

Ultimate analyses and molecular weight determination give 66.1% carbon, 10.1% nitrogen, 6.35% hydrogen, and a molecular weight of 562, all of which check closely with the theoretical values. Use of an equivalent amount of $[(C_4H_9)_2N]_2C_3N_3Cl$ in the above procedure yields the corresponding triazine monomer of the formula $$[(C_4H_9)_2N]_2C_3N_3-OC_6H_4COOCH_2CH=CH_2$$

In a similar manner, there are prepared the monomers listed hereinafter.

They are also prepared by an esterification reaction as in the following procedure.

A mixture of 200 parts of benzene, 31 parts of tri-(carboxymethoxy)triazine, $C_3N_3(OCH_2COOH)_3$, 25 parts of allyl alcohol, and 0.2 parts of toluene sulfonic acid, are reacted in a continuous esterification apparatus until no more water of esterification is eliminated. The mixture is then washed with 10% sodium carbonate-aqueous solution until the aqueous layer is alkaline and then with water to neutrality and freedom from salts. The benzene is then removed under reduced pressure, leaving the triazine monomer of the formula $$(C_3N_3)(OCH_2COOCH_2CH=CH_2)_3$$

which is recrystallized from acetone-water mixtures. Analyses for carbon, hydrogen, and nitrogen give values in close agreement with the theoretical values. Substitution in the above procedures by other triazinyl oxy acids, for example, by $(CH_3O)-C_3N_3(OCH_2COOH)_2$
$(C_2H_5O)_2PO-C_3N_3(OC_6H_4COOH)_2$
$HO-C_3N_3[O(CH_2)_5COOH]_2$
$ClC_6H_4NH-C_3N_3(OCH_2COOH)_2$
                 $\mid$
                 $CHCOOH$

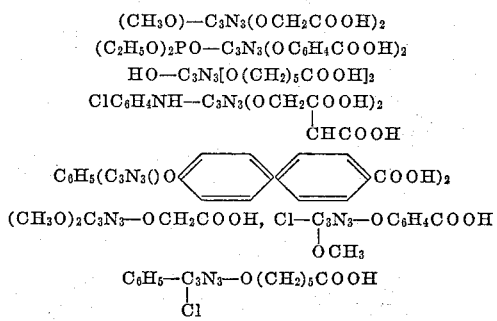

$(CH_3O)_2C_3N_3-OCH_2COOH$, $Cl-C_3N_3-OC_6H_4COOH$
                                      $\mid$
                                      $OCH_3$ $C_6H_5-C_3N_3-O(CH_2)_5COOH$
      $\mid$
      $Cl$ etc., in the foregoing procedure produces the corresponding monomers, whereas replacement of the allyl alcohol by other alcohols, such as $\quad CH_3 \qquad\qquad CH_3$
$\quad \mid \qquad\qquad\quad \mid$
$CH_2=C-CH_2OH$, $CH_2=CH-CHOH$ etc., produces the corresponding triazine monomer.

By these procedures, various monomers of this invention are prepared which have the following formulas:

$C_3N_3(OCH_2COOCH_2C=CH_2)_3$; $C_3N_3(OCH_2COOCH_2CH=CH_2)_3$
                $\mid$
                $CH_3$
$C_3N_3(OCH_2CH_2COOCH_2CH=CH_2)_3$
$C_3N_3(OCH_2COOCH=CH_2)_3$; $C_3N_3(OC_6H_4COOCH_2CH=CH_2)_3$
$CH_3O-C_3N_3(OC_6H_4COOCH_2-CH=CH_2)_2$
$(C_4H_9)_2N-C_3N_3(OCH_2CH_2CH_2CH_2COOCH_2=CH_2)_2$
                                            $\mid$
                                            $CH_3$
$C_2H_5O-C_3N_3(OC_6H_{10}COOCH=CH_2)_2$ $HO-C_3N_3-\begin{bmatrix} COOCH_2CH=CH_2 \\ O-CH \\ \mid \\ CH_2 \\ \mid \\ COOCH_2CH=CH_2 \end{bmatrix}_2$ $CH_2=CH-CH_2OOC(CH_2)_5NH-C_3N_3(OCH_2COOCH_2CH=CH_2)_2$
$C_6H_5-C_3N_3(OC_6H_4COOCH_2-CH=CH_2)_2$
$(CH_3O)_2-C_3N_3OCH_2CH_2O-C_3N_3(OCH_2COOCH_2CH=CH_2)_2$
$CH_2=CHCH_2O-C_3N_3(OC_6H_4COOCH_2CH=CH_2)_2$
$CH_3CONHCH_2CH_2O-C_3N_3(OC_6H_4COOCH_2CH=CH_2)_2$
$CH\equiv C-CH_2O-C_3N_3(OCH_2COOCH_2CH=CH_2)_2$
$(C_6H_5)_2N-C_3N_3(OCH_2COOCH_2CH=CH_2)_2$ (CH₃)₂N—C₃N₃—OCH₂COOCH₂CH=CH₂
         |
         Cl (CH₃)₂N—C₃N₃—OC₆H₄COOCH₂CH=CH₂
         |
         Cl C₆H₅—C₃N₃—O(CH₂)₅COOCH₂CH=CH₂
       |
       Cl (CH₃O)₂—C₃N₃—OCH₂COOCH₂CH=CH₂

CH₃O—C₃N₃—OC₆H₄COOCH₂CH=CH₂
       |
       Cl

C₆H₅—C₃N₃—OC₆H₁₀COOCH₂CH=CH₂
       |
       OCH₃

C₆H₅—C₃N₃—OC₁₀H₆COOCH=CH₂
       |
       N(C₂H₅)₂

CH≡C—CH₂OC₃N₃(OC₆H₄COOCH₂CH=CH₂)₂

CH₂=CHCH₂OCH₂CH₂O—C₃N₃—OC₆H₄COOCH₂CH=CH₂
                    |
                    Cl

CH₃CONH—C₃N₃—OCH₂COOCH₂CH=CH₂
          |
          Cl

C₆H₅CONH—C₃N₃—OC₆H₄COOCH₂CH=CH₂
           |
           Cl

The monomers of this invention are chemical compounds which can also be used as chemical intermediates for the preparation of new compounds which can have utility other than in the preparation of polymers. As an example, these monomeric compounds can be halogenated to produce the chloro or bromo derivatives, etc., as illustrated by the reaction CH₃O—C₃N₃—OCH₂COOCH₂CH=CH₂ + Br₂ →
       |
       Cl CH₃O—C₃N₃—OCH₂COOCH₂CHBrCH₂Br
       |
       Cl When the monomer has 2 or 3 unsaturated groups the halogenation can be limited so as to leave one such unsaturated group and give a product which can be polymerized, such as Cl—C₃N₃—OCH₂COOCH₂CH=CH₂
     |
     OCH₂COOCH₂CHBrCH₂Br Polymers and copolymers prepared from this latter compound have built-in flame resistance. The halogenated compounds in which the unsaturation has been completely reacted with the halogen can be used as modifiers for polymers to give plasticity and improve their flame resistance.

Other typical halogenated derivatives are:

C₃N₃(OCH₂COOCH₂CHClCH₂Cl)₃

C₃N₃(OCH₂COOCH₂CHClCH₂Cl)₂
    |
    OCH₂COOCH₂CH=CH₂

C₃N₃(OCH₂COOCH₂CHBrCH₂Br)₂
    |
    OCH₂COOCH₂CH=CH₂

C₃N₃(OCH₂COOCH₂CHBrCH₂Br)₃

Cl—C₃N₃—OCH₂COOCH₂CHBrCH₂Br
     |
     OCH₂COOCH₂CH=CH₂

Cl—C₃N₃—OC₆H₄COOCH₂CHBrCH₂Br
     |
     OC₆H₄COOCH₂CH=CH₂

Cl—C₃N₃—OC₆H₄COOCH₂CHClCH₂Cl
     |
     OC₆H₄COOCH₂CH=CH₂

C₃N₃(OC₆H₄COOCH₂CHClCH₂Cl)₂
    |
    OC₆H₄COOCH₂CH=CH₂

C₃N₃(OC₆H₄COOCH₂CHBrCH₂Br)₂
    |
    OC₆H₄COOCH₂CH=CH₂

These monomers can be epoxidized with H₂O₂ and an acid according to well known procedures to give compounds such as

CH₃O—C₃N₃(OC₆H₄COOCH₂CH—CH₂)₂
                          \O/

These derivatives can be used as hydrohalide acceptors, intermediates in the preparation of adhesives and for the preparation of varnishes, paints, etc.

While certain features of this invention have been described in detail with respect to various embodiments thereof, it will, of course, be apparent that other modifications can be made within the spirit and scope of this invention, and it is not intended to limit the invention to the exact details shown above, except insofar as they are defined in the following claims:

The invention claimed is:

1. A triazine compound of the formula $$Y_{3-n}[C_3N_3][O-Z-COO(CR''_2)_mCR''=CH_2]_n$$

wherein:

n is an integer having a value of at least 1 and no more than 3;

Z has no more than 18 carbon atoms and is selected from the class consisting of alkylene, cyclohexylene, alkylene, phenylene, naphthylene, diphenylene, diphenyleneoxide, diphenylenesulfide, and diphenyleneamine and derivatives thereof in which there is only one derivative group therein and said derivative group is selected from the class consisting of chloro, fluoro, alkoxy, phenylalkoxy, alkenoxy and hydrocarbon carboxylic acyloxy groups;

R'' is selected from the class consisting of hydrogen, halogen and hydrocarbon of no more than 10 carbon atoms;

m is an integer having a value of at least 0 and no more than 1;

Y has no more than 18 carbon atoms and is selected from the class consisting of halogen, —OR', —NR'₂, —SR', alkenyl, alkyl, aryl, having only benzene nuclei, cyclohexyl and cyclopentyl;

R' is selected from the class consisting of hydrogen and hydrocarbon of no more than 8 carbon atoms; and C₃N₃ represents the trivalent symmetrical triazine nucleus.

2. The triazine compound of the formula

C₃N₃(OC₆H₄COOCH₂CH=CH₂)₃

3. The triazine compound of the formula (C₄H₉)₂N—C₃N₃(OC₆H₄COOCH₂CH=CH₂)₂

4. The triazine compound of the formula

[(C₄H₉)₂N]₂C₃N₃—OC₆H₄COOCH₂CH=CH₂

5. The triazine compound of the formula

C₃N₃(OCH₂COOCH₂CH=CH₂)₃

6. The triazine compound of the formula

C₃N₃(OCH₂COOCH=CH₂)₃

7. The triazine compound of the formula

CH₃O—C₃N₃(OC₆H₄COOCH₂CH=CH₂)₂

8. The triazine compound of the formula (C₄H₉)₂N—C₃N₃[O(CH₂)₄COOCH₂C=CH₂]₂
                                |
                                CH₃

9. The triazine compound of the formula

C₆H₅—C₃N₃(OC₆H₄COOCH₂CH=CH₂)₂

10. The triazine compound of the formula

CH₂=CHCH₂O—C₃N₃(OC₆H₄COOCH₂CH=CH₂)₂

11. The triazine compound of the formula

CH₃CONHCH₂CH₂O—C₃N₃(OC₆H₄COOCH₂CH=CH₂)₂

12. The triazine compound of the formula (CH₃)₂N—C₃N₃—OCH₂COOCH₂CH=CH₂
         |
         Cl 13. The triazine compound of the formula $$(CH_3)_2N-C_3N_3-OC_6H_4COOCH_2CH=CH_2$$
$$|$$
$$Cl$$

14. The triazine compound of the formula $$C_6H_5-C_3N_3-O(CH_2)_5COOCH_2CH=CH_2$$
$$|$$
$$Cl$$

15. The triazine compound of the formula $$(CH_3O)_2C_3N_3-OCH_2COOCH_2CH=CH_2$$

16. The triazine compound of the formula $$CH_3O-C_3N_3-OCH_2COOCH_2CHBrCH_2Br$$
$$|$$
$$Cl$$

17. The triazine compound of the formula $$Cl-C_3N_3-OCH_2COOCH_2CH=CH_2$$
$$|$$
$$OCH_2COOCH_2CHBrCH_2Br$$

18. The triazine compound of the formula $$C_3N_3(OCH_2COOCH_2CHClCH_2Cl)_2$$
$$|$$
$$OCH_2COOCH_2CH=CH_2$$

19. The triazine compound of the formula $$C_3N_3(OCH_2COOCH_2CHBrCH_2Br)_2$$
$$|$$
$$OCH_2COOCH_2CH=CH_2$$

20. The triazine compound of the formula $$(C_6H_5)_2N-C_3N_3(OCH_2COOCH_2CH=CH_2)_2$$

References Cited by the Examiner

UNITED STATES PATENTS

| | | | |
|---|---|---|---|
| 2,328,961 | 9/43 | D'Alelio et al. | 260—249.5 |
| 2,335,045 | 11/43 | D'Alelio et al. | 260—249.8 |
| 2,725,397 | 11/55 | Bernstein et al. | 260—249.6 |
| 2,731,438 | 1/56 | Layman | 260—249.8 |
| 2,742,466 | 4/56 | Randall et al. | 260—249.5 |
| 2,810,706 | 10/57 | Frazier et al. | 260—249.8 |
| 2,993,877 | 7/61 | D'Alelio | 260—249.5 |
| 3,047,532 | 7/62 | D'Alelio | 260—249.6 |
| 3,050,496 | 8/62 | D'Alelio | 260—248 |
| 3,056,760 | 10/62 | D'Alelio | 260—249.6 |

IRVING MARCUS, *Primary Examiner.*

JOHN D. RANDOLPH, WALTER A. MODANCE,
*Examiners.*

UNITED STATES PATENT OFFICE
CERTIFICATE OF CORRECTION

Patent No. 3,165,514           January 12, 1965

Gaetano F. D'Alelio

It is hereby certified that error appears in the above numbered patent requiring correction and that the said Letters Patent should read as corrected below.

Column 10, lines 13 and 14, the formula should appear as shown below instead of as in the patent:

$$Y_{3-n}[C_3N_3]O-Z-COO(CR''_2)_m CR''=CH_2]_n$$

Signed and sealed this 14th day of September 1965.

(SEAL)
Attest:

ERNEST W. SWIDER
Attesting Officer

EDWARD J. BRENNER
Commissioner of Patents